US006889052B2

(12) United States Patent
Geier et al.

(10) Patent No.: US 6,889,052 B2
(45) Date of Patent: May 3, 2005

(54) METHOD AND APPARATUS FOR GENERATING TIME OF ARRIVAL ESTIMATES FOR USE IN DETERMINING A LOCATION

(75) Inventors: George Geier, Scottsdale, AZ (US); Christopher Bussan, Crystal Lake, IL (US); Todd Conroy, Lincolnshire, IL (US); Eric Hefner, Gumee, IL (US); John Solar, Woodstock, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/231,851

(22) Filed: Aug. 30, 2002

(65) Prior Publication Data

US 2004/0203871 A1 Oct. 14, 2004

(51) Int. Cl.[7] ................................................. H04Q 7/20
(52) U.S. Cl. ............................... 455/456.1; 455/404.1; 455/457; 342/357.1
(58) Field of Search ............................. 455/464.2, 405, 455/456.1, 456.3, 456.5, 456.6, 457, 456.2, 456.4, 404.1, 404.2; 342/450, 457, 357.1, 357.8, 357.06, 357.13; 701/457, 207; 340/905

(56) References Cited

U.S. PATENT DOCUMENTS

| | | | | |
|---|---|---|---|---|
| 5,058,200 A | * | 10/1991 | Huang et al. | 455/456.2 |
| 5,293,645 A | * | 3/1994 | Sood | 455/456.2 |
| 5,343,209 A | * | 8/1994 | Sennott et al. | 342/357.02 |
| 5,884,215 A | * | 3/1999 | Birchler et al. | 701/207 |
| 5,890,068 A | * | 3/1999 | Fattouche et al. | 455/456.2 |
| 6,009,334 A | * | 12/1999 | Grubeck et al. | 455/456.2 |
| 6,108,558 A | * | 8/2000 | Vanderspool, II | 455/456.2 |
| 6,191,738 B1 | * | 2/2001 | Pfeil et al. | 342/457 |
| 6,266,014 B1 | | 7/2001 | Fattouche et al. | |
| 6,282,427 B1 | * | 8/2001 | Larsson et al. | 455/456.2 |
| 6,381,464 B1 | * | 4/2002 | Vannucci | 455/456.1 |
| 6,434,124 B1 | * | 8/2002 | Rege | 370/311 |
| 6,445,927 B1 | * | 9/2002 | King et al. | 455/456.6 |
| 6,470,185 B2 | * | 10/2002 | Kangas et al. | 455/456.1 |
| 6,546,256 B1 | * | 4/2003 | Maloney et al. | 455/404.2 |
| 6,675,018 B2 | * | 1/2004 | Villier et al. | 455/456.1 |
| 2004/0072582 A1 | * | 4/2004 | Aljadeff et al. | 455/456.1 |

FOREIGN PATENT DOCUMENTS

WO     WO 00/42445     7/2000

OTHER PUBLICATIONS

Villier, E.; Lopes, L.; Ludden, B.; IEEE Vehicular Technology Conference Proceedings, 1999, vol.: 3, May 16–20, 1999; pp. 1967–1972.

GSM ETSI TS 101 527 V7.2.0 (May 2005) Technical Specification Digital cellular telecommunications system (Phase 2+); Location Services (LCS); Mobile Station (MS)—Serving Mobile Location Centre (SMLC) Radio Resource LCS Protocol (RRLP) (GSM 04.31 version 7.2.0. Release 1998).

* cited by examiner

*Primary Examiner*—Tilahun Gesesse
(74) *Attorney, Agent, or Firm*—Lawrence J. Chaps (57) ABSTRACT

The present invention provides a method and apparatus for generating time of arrival estimates for use by a wireless communication network for locating the position of a wireless or mobile source (102) within the service area of the wireless communication network. The mobile source generates time of arrival estimates from data bursts received from base sites (100) operating within the network. In at least one embodiment, the mobile source (102), then, communicates the time of arrival estimates for each of the base sites (100) to the network, from which the location of the mobile source (102) is determined. In at least some instances, the mobile units additionally determine a variance estimate for each time of arrival estimates, which is representative of the degree of confidence in the time of arrival information being supplied to the network.

37 Claims, 7 Drawing Sheets

METHOD AND APPARATUS FOR GENERATING TIME OF ARRIVAL ESTIMATES FOR USE IN DETERMINING A LOCATION

FIELD OF THE INVENTION

The present invention relates generally to the location of wireless or mobile source within the service area of a wireless communication network and, more particularly, to generating time of arrival estimates from data bursts received from base sites operating within the network.

BACKGROUND OF THE INVENTION

The FCC has adopted several initiatives designed to improve the handling of 911 calls from wireless/mobile sources. One such initiative includes a requirement for locating the wireless unit originating the call, within a set of predefined limits. For example, a first phase of the scheduled improvements requires that cell phones making an emergency call using the 911 system be locatable within 100 meters of their actual location at least 67 percent of the time, and within 300 meter of their actual location at least 95 percent of the time. A further phase of the scheduled improvements requires that these limits improve even more, such that the cell phones making an emergency call could be located within 50 meters/67 percent of the time and 150 meters/95 percent of the time.

One suggestion for meeting the scheduled FCC initiatives involves adding GPS location capability to each phone. However, this suggestion can be relatively costly, and would require a substantial change to many already existing phone designs. A further suggestion for meeting the scheduled FCC initiatives involves extracting time-of-arrival information from several base stations from which the mobile handset can collect bursts of data. The time-of-arrival data is then sent to the network, where the location of the handset is determined.

However one of the difficulties of using time-of-arrival information received from multiple base stations includes the fact that individual base stations are not generally time synchronized. At least one solution to the lack of time synchronization has included the use of Location Measurement Units (LMUs), which similarly receive time of arrival information from the same base stations and compute correction information based upon the measured values and generally known fixed locations.

A further complication to determining or extracting accurate and reliable time-of-arrival values includes the fact that cellular signals do not always arrive at the mobile subscriber through a line of sight path. Often times the signal received has been reflected off of one or more elements. In some instances the elements are man-made, like a building. In other instances the elements can occur naturally, for example a tree or a mountain. However generally the reception of wireless signals via indirect paths is generally more pronounced in urban environments, where a large percentage of the wireless communication traffic is occurring, and there is a high density of objects capable of reflecting a signal.

At least one prior reference attempts to address some of the problems associated with obtaining time arrival information, namely, Villier et al., U.S. patent application Ser. No. 09/468,998, entitled "Method and System for Estimating a Time of Arrival of a Radio Signal", assigned to Motorola, the disclosure of which is incorporated herein by reference. In Villier et al. the time of arrival values corresponding to the line of sight paths are identified, by taking a subset of the total number of time of arrival values, which fall within a predetermined percentage range. In some instances this corresponds to the lowest time of arrival values.

However a further difficulty in determining accurate time of arrival information includes the fact that the reference clock for each base station is allowed to drift. Therefore any correction information received from a Location Measurement Unit is generally only good for data bursts that are received at the same time or proximate to the time that the correction information is determined.

Consequently, there is a need for a method and apparatus for generating time of arrival estimates, which take into account any drift in the reference clock of the base station.

SUMMARY OF THE INVENTION

The present invention provides a method of generating time of arrival estimates for use in determining the location of a mobile unit within a wireless communication network. The method includes receiving a plurality of data bursts from a group of base sites during a burst collection period. A time of arrival value for each of the data bursts is then determined. The time of arrival values, which more closely correspond to a line of sight path are then selected. A drift value is then estimated for each of the base sites from the selected time of arrival values. A time of arrival estimate is then generated for each of the base sites corresponding to a particular time during the burst collection period.

In at least one embodiment, determining a time of arrival value for each of the data bursts includes sampling each of the received data bursts at multiple sampling points, and correlating the sampling points of each of the plurality of data bursts, received during the burst collection period, with a corresponding predetermined data pattern.

In at least a further embodiment, the time of arrival values, which more closely correspond to a line of sight path, are selected based upon a window of time that occurs before and after a median or a mean time of arrival value, where the window of time is computed based upon the length in time of the burst collection period and the permissible rate of drift for the base sites.

The present invention further provides a processor unit for use in a wireless communication device, coupled to a receiver, which generates a time of arrival estimate for each of a group of base sites. The processor control unit includes a processor and an interface unit, coupled to said processor and the receiver, for configuring the receiver to receive signals corresponding to the group of base sites, and for receiving a plurality of data bursts. A storage unit is coupled to said processor for storing sampling data of the plurality of data bursts and one or more sets of instructions for execution by the processor.

The sets of instructions include prestored instructions for receiving a plurality of data bursts from a group of base sites during a burst collection period and determining a time of arrival value for each of the data bursts, prestored instructions for selecting the time of arrival values, which more closely correspond to a line of sight path and estimating a drift value for each of the base sites from the selected time of arrival values, and prestored instructions for generating a time of arrival estimate for each of the base sites corresponding to a particular time during the burst collection period.

In at least one of the embodiments, the processor unit is incorporated as part of a wireless communication device, where the wireless communication device includes a receiver and an antenna coupled to the receiver. In a still further embodiment, the wireless communication device further includes a transmitter coupled to the antenna for transmitting the time of arrival estimate generated for each of the base sites.

These and other features, and advantages of this invention are evident from the following description of one or more preferred embodiments of this invention, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 1:
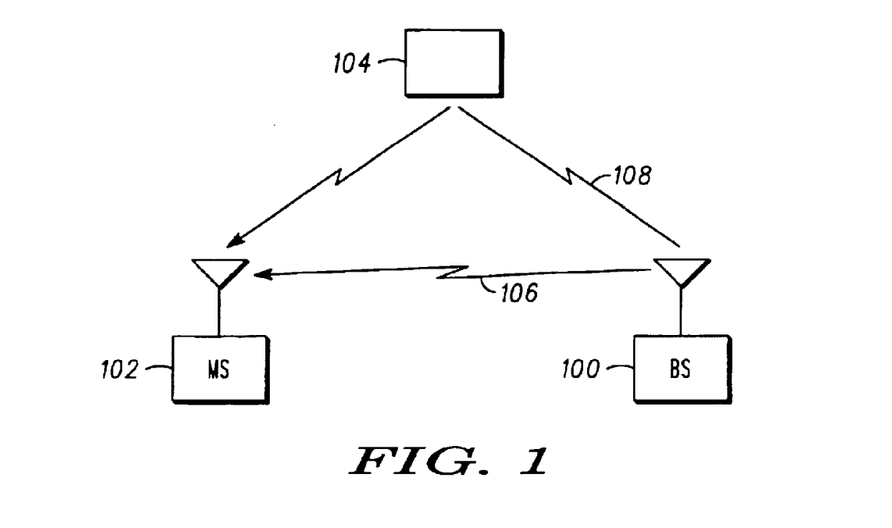
FIG. 1 illustrates at least one circumstance when multipath propagation of a signal can occur in a wireless communication system.

FIG. 1 illustrates an example of where multipath propagation of a signal can occur in a wireless communication system. More specifically, FIG. 1 illustrates base site 100, and a mobile unit or mobile subscriber 102, where a signal is being propagated from the base site 100 to the mobile subscriber 102. Additionally present, is an element, like a building 104, against which a signal can reflect. In the illustrated example, signal propagation occurs along at least two paths. A first path corresponds to a direct line of sight path 106. The second path 108 follows a course, which reflects off of building 104 in route between the base site 100 and the mobile subscriber 102. Because each path has a differing path length, generally, a signal traversing each of the respective paths will arrive at its destination at a different time.

Figure 2:
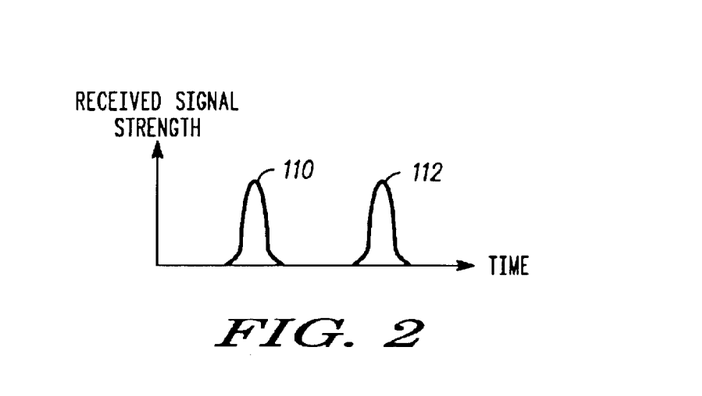
FIG. 2 is an example of a received signal including a single burst of data having different time of arrival values due to multipath propagation.

This is illustrated in FIG. 2, illustrating a graph where a signal is detected at two distinct times. Presumably, the earlier 110 of the two signals, more often corresponds to the signal traversing the line of sight path 106. The later arriving signal 112 more often corresponds to the reflected path 108. In a system dependent upon an accurate determination of a time of arrival, the possibility of reflected signal can negatively impact a time of arrival determination and subsequently have a negative impact on any location determination based upon the time of arrival determination.

Figure 3:
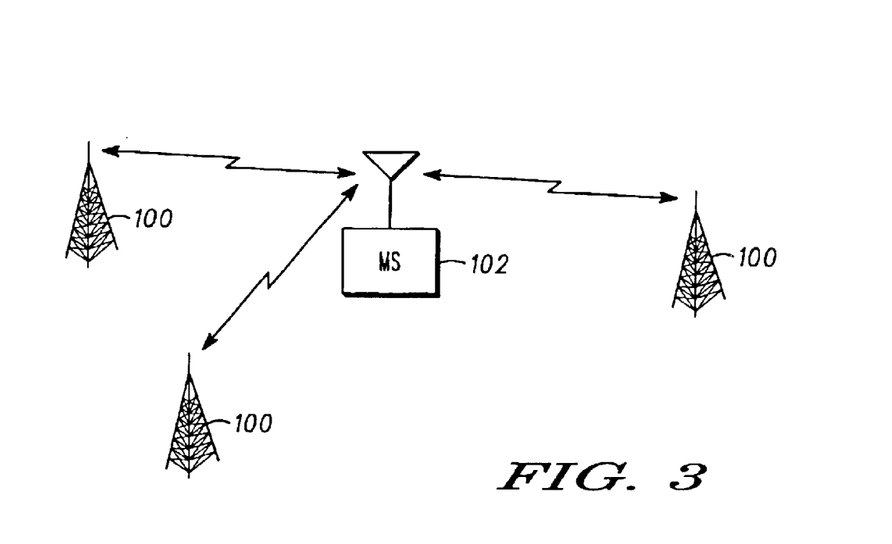
FIG. 3 illustrates a mobile subscriber communicating with at least three base sites, consistent with location determining techniques using triangulation.

One such method of determining a location includes a technique known as triangulation. Traditionally triangulation has involved the use of distance measurements from three known locations, as illustrated in FIG. 3. Once the distance to each of the known locations is determined, intersecting arcs can identify a single location at which the device being located can be found. A method for indirectly determining the distance measurement between a known location and a device being located includes determining the time it takes for a signal to propagate from the known location to the device being located. This is because radio waves generally propagate at a known rate such that if the time of propagation is known, a distance can be computed. However this assumes that the time measurement corresponds to a line of sight path. This also assumes that we know the time that a signal is sent and received, and further assumes that we know the relationship between the master clock at each of the base sites 100 and at the mobile subscriber 102 we are trying to locate. This is further complicated by the fact that the master clocks for the base sites 100, in many systems, are allowed to drift.

Figure 4:
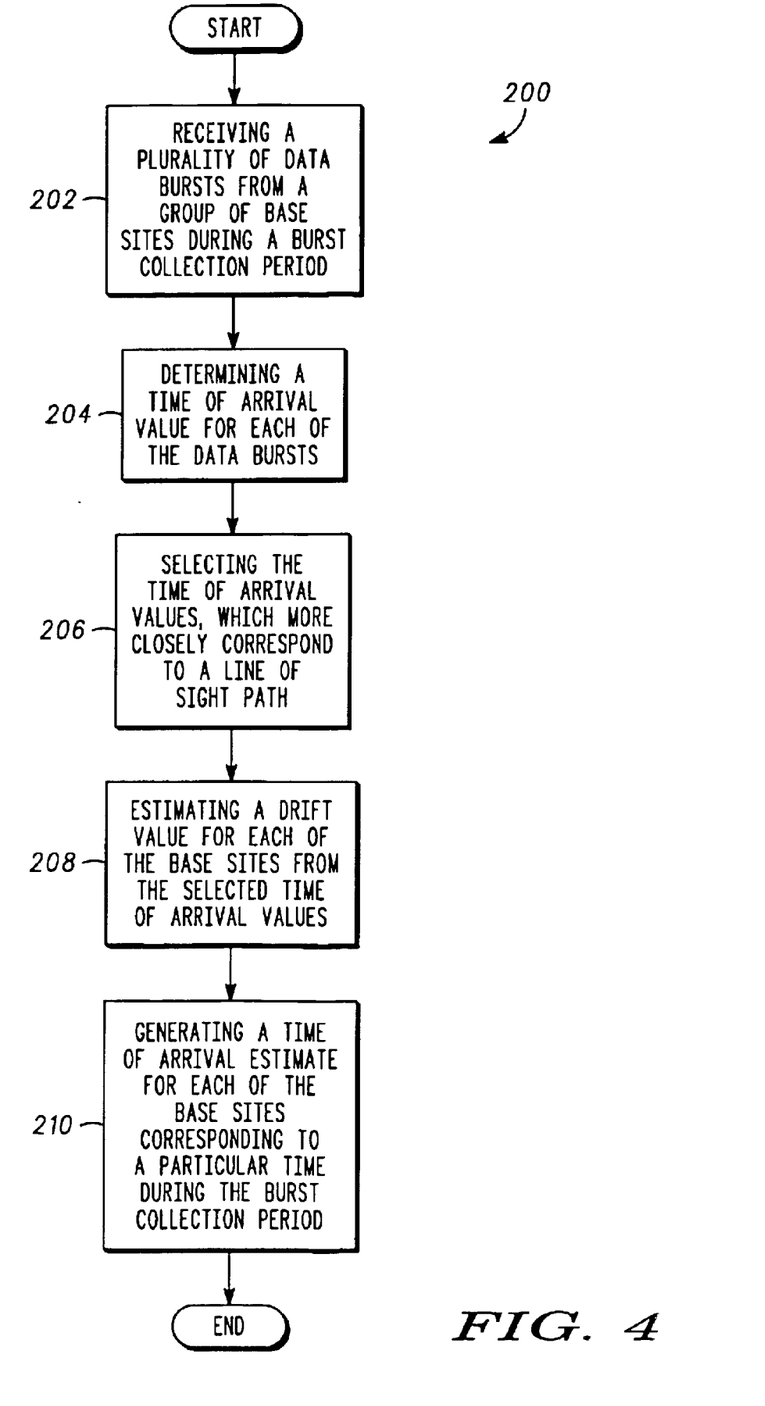
FIG. 4 is a flow diagram of a method for generating time of arrival estimates for use in determining the location of a mobile unit in a wireless network, in accordance with at least one embodiment of the present invention.

FIG. 4 illustrates a method 200 directed to generating time of arrival estimates for use in determining the location of a mobile subscriber within a wireless communication network, in accordance with at least one embodiment, which attempts to overcome and/or address at least some of these issues. Generally, the flow diagram can be implemented in circuitry or as prestored sets of programming instructions, which can be executed on a microprocessor.

The method 200 includes receiving a plurality of data bursts 202 from a group of base sites during a burst collection period. A time of arrival value for each of the data bursts is then determined 204. The time of arrival values, which more closely correspond to a line of sight path are then selected 206. A drift value is then estimated 208 for each of the base sites from the selected time of arrival values. A time of arrival estimate is then generated 210 for each of the base sites, which corresponds to a particular time during the burst collection period. By generating a time of arrival estimate for each of the base sites at a common point in time, a more direct relationship exists for comparing the time of arrival estimates and applying any correction factors determined to be appropriate by the network, like the correction information, which may have been computed in connection with the Location Measurement Units (LMUs).

In receiving a plurality of data bursts from a group of base sites during a burst collection period, at least one embodiment interleaves the monitoring of data bursts from each of the base sites with the monitoring of data bursts from the other base sites. This allows for each base mobile subscriber 102 to determine time of arrival estimates for each of the base sites 100 that are spread across the entire burst collection period. Furthermore, this allows the mobile subscriber 102 to schedule the monitoring of bursts more frequently, as it creates a greater number of scheduling opportunities. This is opposed to waiting for the next burst from a particular base site 100.

Figure 5:
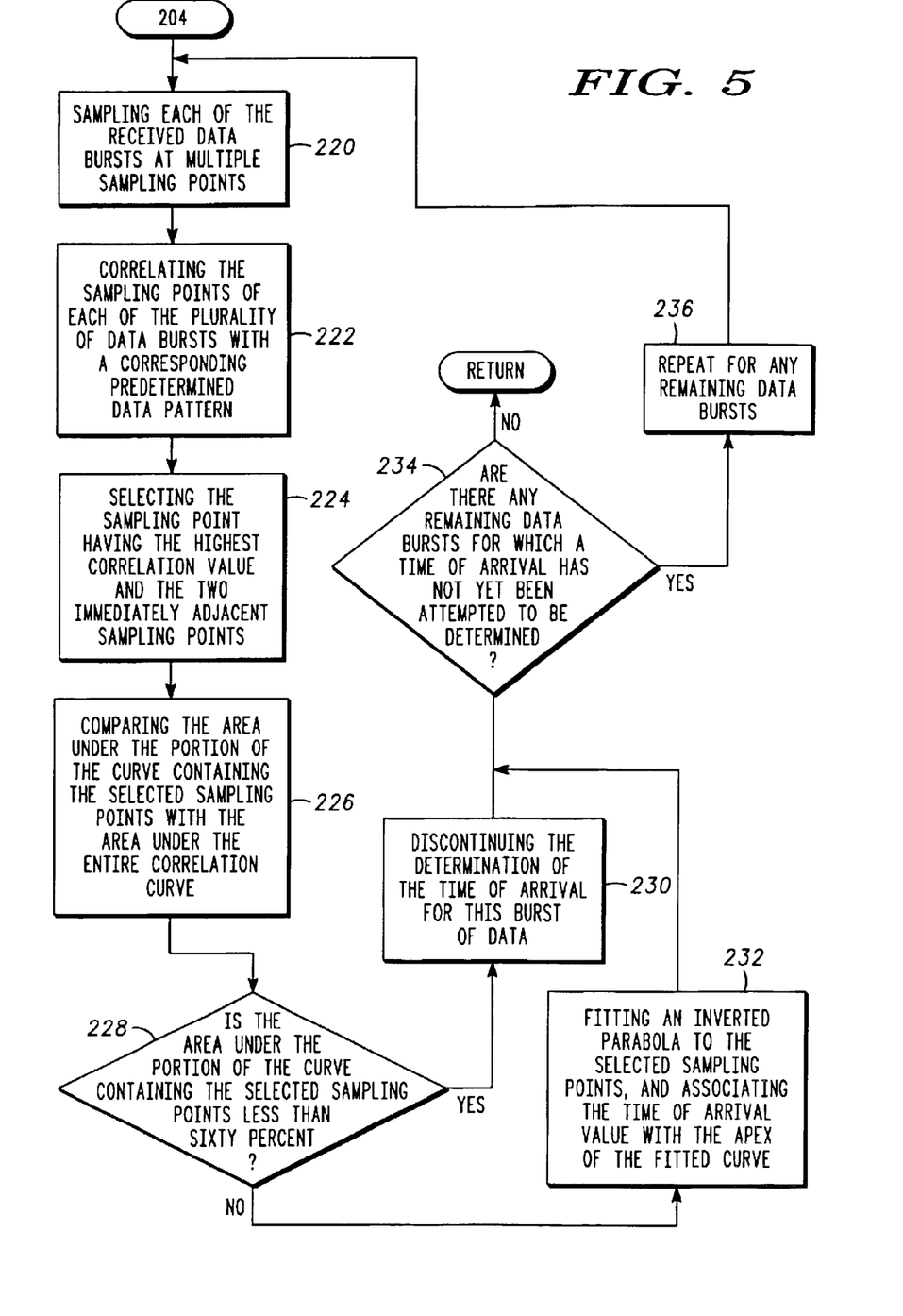
FIG. 5 is a more detailed flow diagram for determining a time of arrival value for each of a plurality of received data bursts.

FIG. 5 illustrates a more detailed flow diagram of at least one embodiment for determining a time of arrival value 204 for each of a plurality of received data bursts. The more detailed flow diagram includes sampling each of the received data bursts at multiple sampling points 220. The sampling points are then correlated with a corresponding predetermined data pattern 222. Generally, the correlation is done with received data for which the value of the data is already known. In some instances the received data bursts may correspond to different types of data bursts, each having a different predetermined data pattern. In other instances it may be possible to modify the predetermined data pattern to take into account information about the environment and/or hardware impairments in order to reduce the variation of the output of the correlation process.

After a correlation value is computed the information is used to determine a time of arrival estimate. Initially, it may be desirable to preview the data to determine if the results of the correlation will be useful and/or the results will correspond to reliable data. In some instances the results from the preview may suggest to abandon the data. For example one such preview procedure provides for comparing 226 the area under the curve of the sampling point having the highest correlation value and the two immediately adjacent sampling points 224, with the area under the entire corresponding portion of the correlation curve. In at least one embodiment if the area under the sampling point having the highest correlation value and the two immediately adjacent sampling points does not equal or exceed sixty percent (i.e. sixty percent of the correlation waveform is not in the peak) 228, then the analysis with respect to this particular data burst is abandoned 230, and no time of arrival value is determined. Otherwise, a time of arrival is determined.

At least one embodiment determines a time of arrival from the correlation information by fitting a parabola to the sampling point having the highest correlation value, along with the two immediately adjacent sampling points 232. If there are any remaining data burst for which a determination of a time of arrival has not yet been attempted 234, a similar procedure is performed for each of the remaining data bursts 236.

Figure 6:
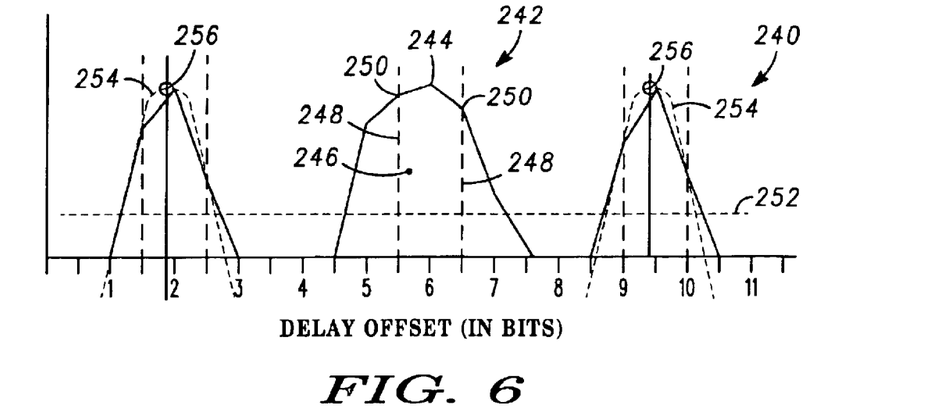
FIG. 6 is graph illustrating an example of correlation values for received data bursts as a function of delay offset.

FIG. 6 illustrates an example of correlation values for received data bursts, which have been graphed 240 as a function of delay offset. In the example, the correlation of three potential bursts is illustrated. In the case of the second burst 242, an analysis of the area under the curve results in a determination that the curve fails to include sixty percent of its area under the peak 246 of the waveform, which is defined as the region bounded 248 by the two sampling points 250 immediately adjacent the sampling point having the highest correlation value 244.

A further test associated with the preview of the correlation data, might exclude from further consideration any correlated waveform, which does not have an overall minimum correlation of at least a predetermined minimum value 252. In at least one embodiment this limit is set to twenty-five percent of the maximum correlation value.

Where a preview of the correlation data does not exclude from further consideration the correlated waveform, a parabola 254 can be fitted to the sampling point having the highest correlation value, and the two immediately adjacent sampling points. The parabola can be fitted using a least squares approach or other curve fitting technique. Similarly, other types of curves may also be used. In the illustrated embodiment, the apex 256 of the fitted curve is used to identify the time of arrival value to be associated with the data burst.

Figure 7A:
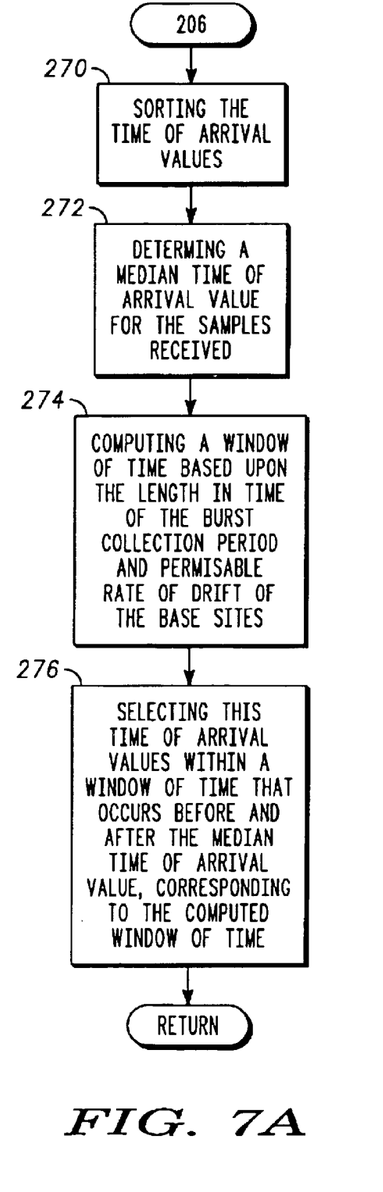
FIGS. 7A and 7B are more detailed flow diagrams of at least two different embodiments for selecting the time of arrival values, which more closely correspond to a line of sight path.
Figure 7B:
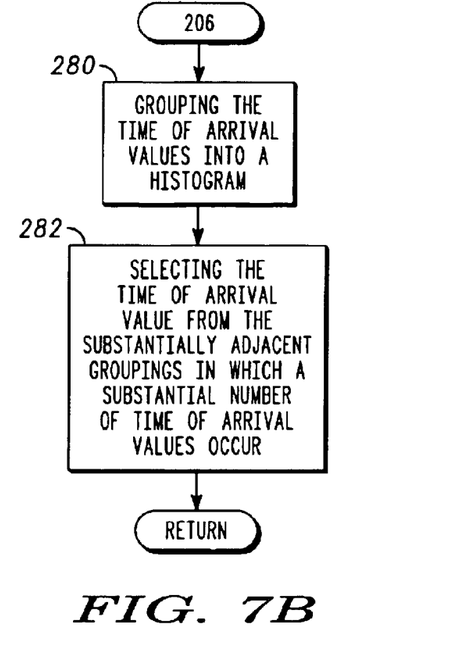
Figure 8:
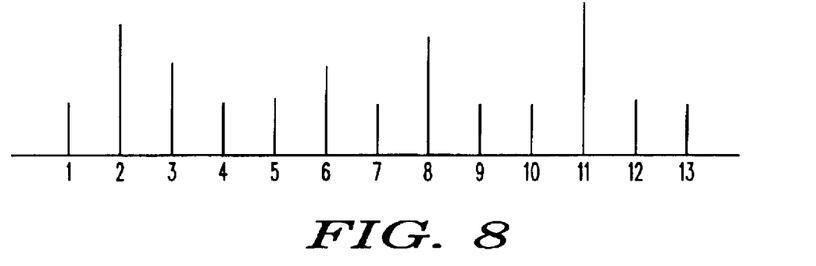
FIG. 8 is a graph illustrating an example of sample time of arrival values for multiple data bursts received from the same base site.
Figure 9:
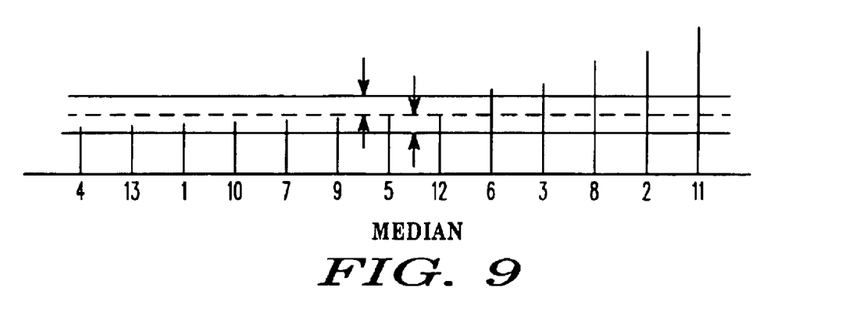
FIG. 9 is a graph illustrating the sample time of arrival values illustrated in FIG. 8, after having been sorted, based upon the value of the time of arrival.

Once a time of arrival has been attempted to be determined for each of the base sites, the determined time of arrival values, which more closely correspond to a line of sight path are selected 206. A couple of approaches, in association with at least two alternative embodiments, are illustrated in FIGS. 7A and 7B. In FIG. 7A, the time of arrival values are sorted 270 and a median time of arrival value is determined 272. FIG. 8 illustrates an example of a set of thirteen time of arrival values. FIG. 9 illustrates the same set of thirteen time of arrival values sorted in ascending order. Once sorted, in the illustrated example, the median value corresponds to the seventh time of arrival value in the sorted list. In the illustrated example, the median time of arrival value corresponds to the fifth time of arrival value from the graph illustrated in FIG. 8.

A window is then computed 274, where the window size is based upon the length in time of the burst collection period and the permissible rate of drift of the base site(s) 100, where, in this instance, the window size is based upon the product of these two values. The determined window size is then added to the median time of arrival value to form an upper limit and subtracted from the median time of arrival value to form a lower limit. All of the time of arrival values located between the upper and lower limits are then selected 276 as more closely corresponding to a line of sight path.

In some instances, instead of using a median value, it is possible to use the mean value of the original determined time of arrival values for each of the base sites. In the same or other instances, it may further be desirable to insure that a minimum number of time of arrival values, were available to be selected. In at least one embodiment, if the number of selected time of arrival values for a particular base site is less than six, then processing of the data bursts and corresponding time of arrival values for this particular base site is terminated. The same test can also be applied prior to this selection step 206 to insure that there are at least a minimum number of time of arrival values available, prior to the values being sorted 270, and a subset of them being selected 276.

Figure 10:
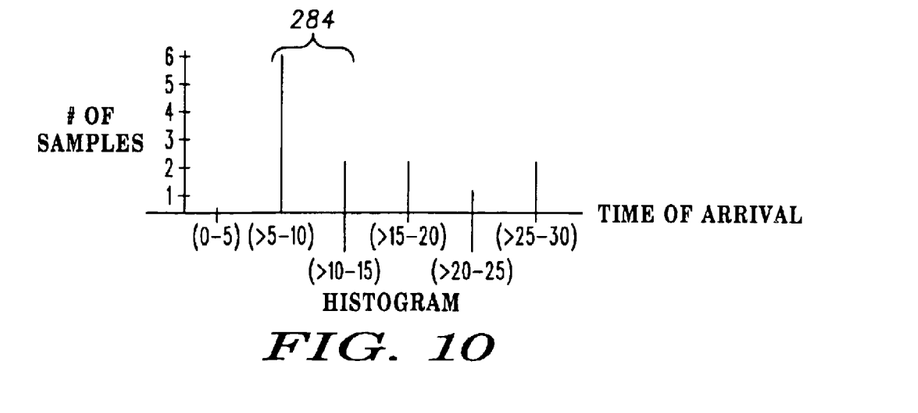
FIG. 10 is a histogram illustrating the number of time of arrival values received for each of a plurality of finite time ranges.

In FIG. 7B, an alternative embodiment provides for the determined time of arrival values to be organized into separate groupings and charted as part of a histogram 280, like the one illustrated in FIG. 10. A substantially adjacent grouping 284 containing a substantial number of the time of arrival values is determined and the time of arrival values contained within those groupings are selected 282. The granularity of the separate groupings used in preparing the histogram can be adjusted accordingly. In most instances the granularity will be much finer than the example illustrated, and in some instances the granularity is substantially related to the sampling rate, which in the present embodiment is at least twice the bit rate.

Figure 11:
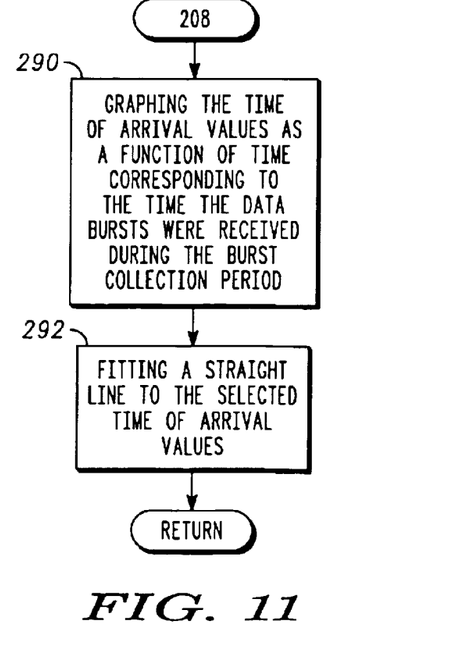
FIG. 11 is a more detailed flow diagram for estimating a drift value for each of the base sites from the selected time of arrival values.
Figure 12:
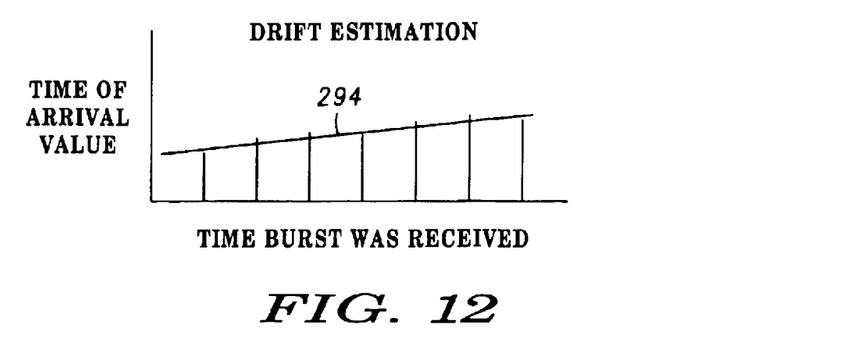
FIG. 12 is a graph of time of arrival values as a function of the time the data bursts were received during the burst collection period.

After the time of arrival values, which more closely correspond to a line of sight path, are selected 206, a drift value for each of the base sites 100 is estimated 208. FIG. 11 includes a more detailed flow diagram for estimating 208 a drift value for each of the base sites from the selected time of arrival values. In at least one embodiment, the time of arrival values for a particular base site are graphed 290 as a function of time corresponding to the time that the data bursts were received during the burst collection period, as illustrated in FIG. 12. A straight line 294 is then fitted 292 to the selected time of arrival values. The fitting of the straight line, in the illustrated embodiment, makes use of a least squares method. Alternatively a Kalman filter or an adaptive Kalman filter can also be used to estimate drift. The slope of the resulting line is used to estimate drift. The resulting line is also used to estimate a single time of arrival value, corresponding to a particular point in time, for each base site. This value is then forwarded to the network for further processing and a determination of location. In this way a single time of arrival value can be forwarded to the network, which is influenced by data from multiple data bursts, creating a composite value, that will likely filters out any anomalies associated with one or, in other cases, a minority of the data bursts.

In addition to the single estimated time of arrival value for each of the base sites, the mobile subscriber additionally includes a variance value for each of the estimated time of arrival values. The variance value attempts to convey a degree of confidence in the transmitted time of arrival values, which can be affected by the number of data bursts used to formulate the estimated time of arrival value, as well as describe how well the resulting fitted curve matched the data.

In at least one instance the variance value is determined from the general spread of the selected time of arrival values. In this instance, the variance is computed to be equal to the square root of the sum of the square of the differences between the determined time of arrival value for the selected data burst and the mean value of all of the selected time of arrival values, all of which is divided by the number of data bursts used to determine the selected times of arrival (i.e. the standard deviation or the absolute spread). In other instances, the variance value is the value of the least squares value determined during the process of fitting the straight line to the selected time of arrival values, while estimating drift.

Figure 13:
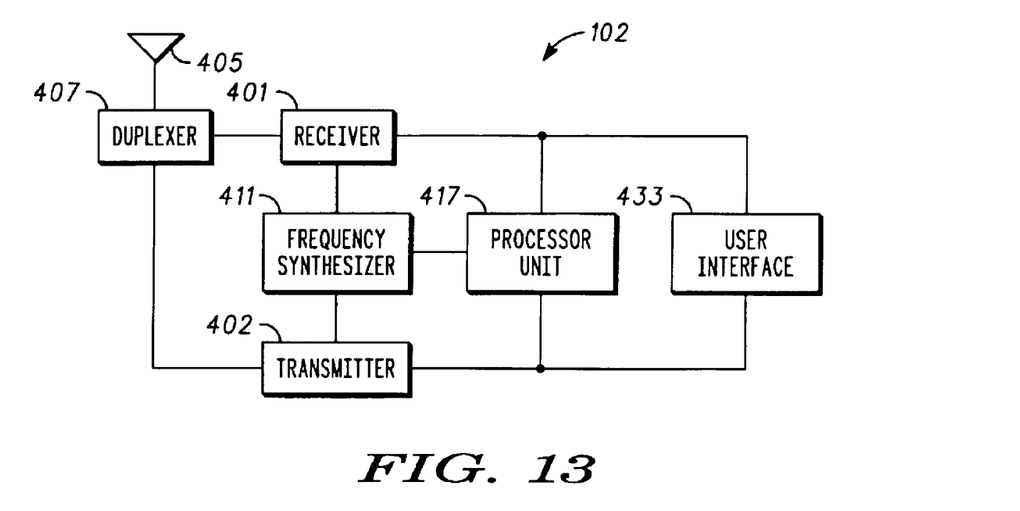
FIG. 13 is a block diagram of wireless communication device for generating a time of arrival value, in accordance with the present invention.

FIG. 13 illustrates a wireless communication device including a processor unit in accordance with at least one embodiment of the present invention. The wireless communication device corresponds to the mobile subscriber 102. The wireless communication device includes a radio receiver 401 and a transmitter 403. Both the receiver 401 and the transmitter 403 are coupled to an antenna 405 of the wireless communication device by way of a duplexer 407. The particular radio frequency to be used by the transmitter 403 and the receiver 401 is determined by a processor unit 417 and conveyed to the frequency synthesizer 411. In the more detailed block diagram, illustrated in FIG. 14, the particular radio frequency is determined by the microprocessor 409 and it is conveyed to the frequency synthesizer 411 via the interface circuitry 413. Data signals received by the receiver 401 are decoded and coupled to the microprocessor 409 by the interface circuitry 413, and data signals to be transmitted by the transmitter 403 are generated by the microprocessor 409 and formatted by the interface circuitry 413 before being transmitted by the transmitter 403. Operational status of the transmitter 403 and the receiver 401 is enabled or disabled by the interface circuitry 413.

Figure 14:
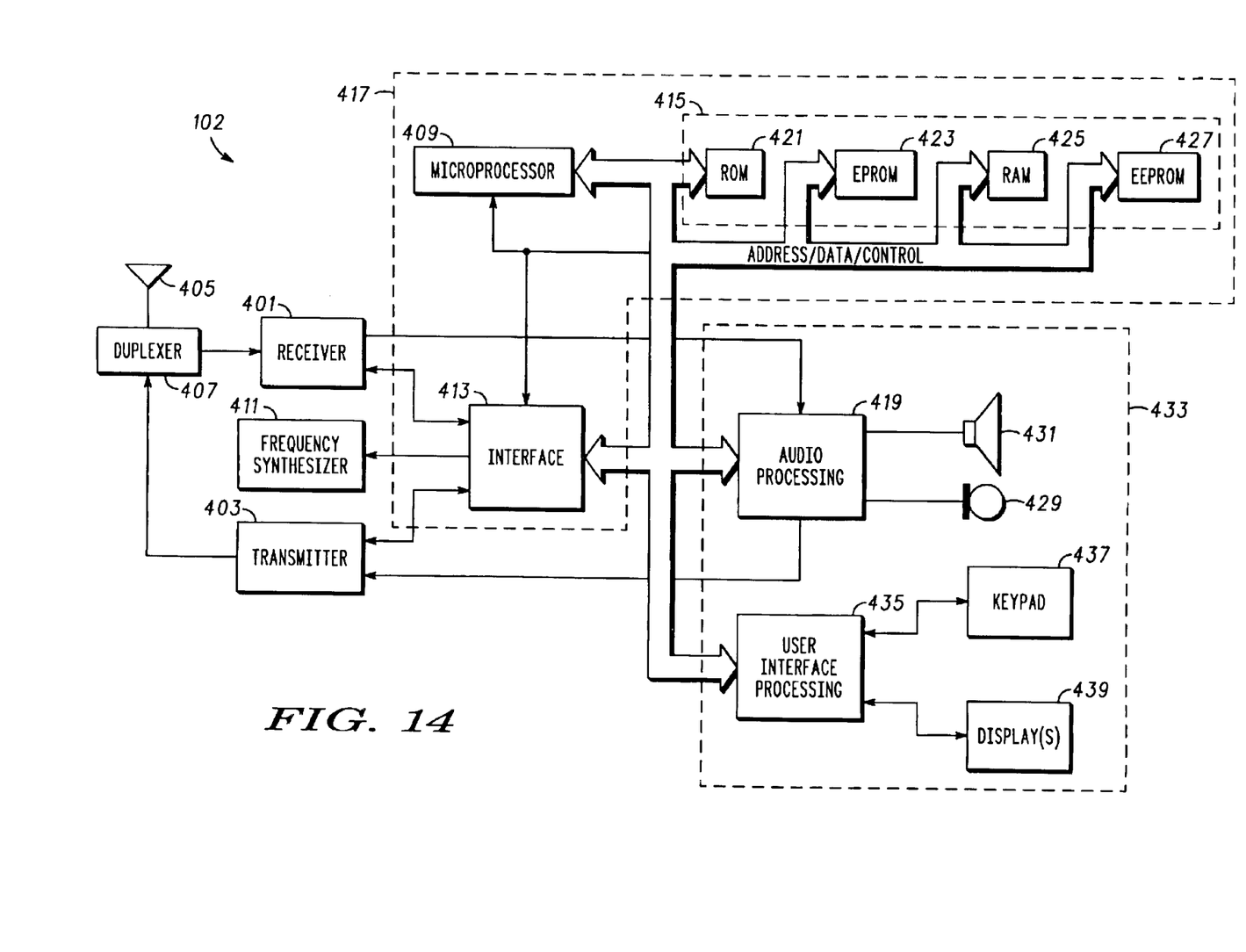
FIG. 14 is a more detailed block diagram of the wireless communication device illustrated in FIG. 13.

In the preferred embodiment, the microprocessor 409 forms part of the processing unit, which in conjunction with the interface circuitry 413 performs the necessary processing functions under the control of programs stored in a memory section 415. Together, the microprocessor 409 and the interface circuitry 413 can include one or more microprocessors, one or more of which may include a digital signal processor (DSP). The memory section 415 includes one or more forms of volatile and/or non-volatile memory including conventional ROM 421, EPROM 423, RAM 425, or EEPROM 427. Characterizing features of the wireless communication device are typically stored in EEPROM 427 (which may also be stored in the microprocessor in an on-board EEPROM, if available) and can include the number assignment (NAM) required for operation in a conventional cellular system and/or the base identification (BID) required for operation with a cordless base. Additionally stored in the memory section 415 are the multiple sets of prestored instructions used in scanning for neighboring cells.

Control of user audio, the microphone 429 output and the speaker 431 input, is controlled by audio processing circuitry 419, which forms part of a user interface circuit 433. The user interface circuit 433 additionally includes user interface processing circuitry 435, which manages the operation of any keypad(s) 437 and/or display(s) 439. It is further envisioned that any keypad operation could be included as part of a touch sensitive display.

Figure 15:
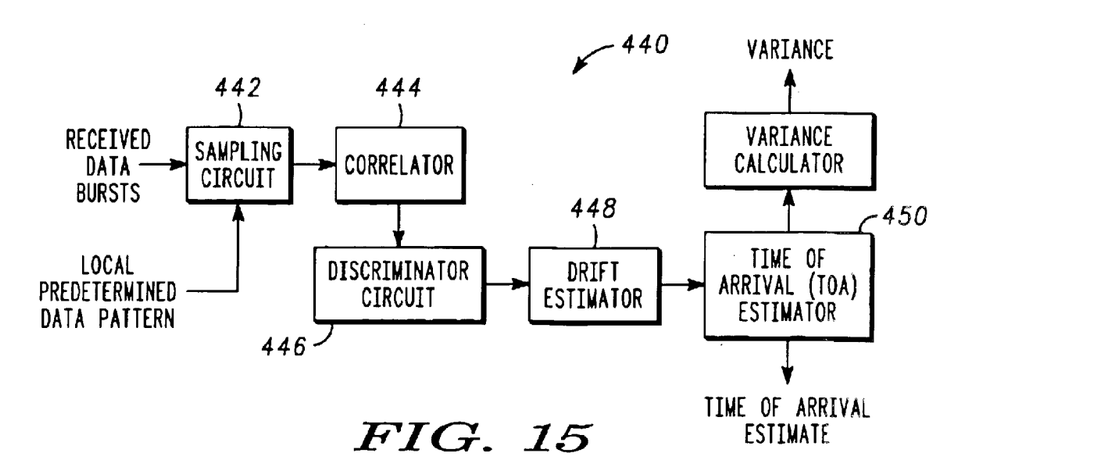
FIG. 15 is a block diagram illustrating at least one embodiment of a processor unit for generating a time of arrival estimate for each of a group of base sites, in accordance with the present invention.

In a still further embodiment, a block diagram of a processor unit 446 is illustrated in FIG. 15, for generating a time of arrival estimate for each of a group of base sites, in accordance with the present invention. The processor unit 440 includes a sampling circuit 442 for producing multiple sampling points from a received signal. The process unit 440 further includes a correlator 444, coupled to the sampling circuit, for correlating the sampling points with a corresponding predetermined data pattern and determining a time of arrival value for each data burst. A discriminator circuit 446 is coupled to the correlator 444, and selects the time of arrival values, which most closely correspond to a line of sight path. The processor unit still further includes a drift estimator 448, which is coupled to the discriminator circuit 446, and which estimates an estimated drift value of the reference clock for each of the base stations from the selected time of arrival values.

A time of arrival estimator 450 is coupled to the drift estimator 448 for estimating a time of arrival value from the estimated drift calculation for each of the base stations for a selected substantially consistent point in time, and a variance calculator 452 is coupled to the time of arrival estimator 450 for computing a variance value corresponding to the accumulated degree of deviation of the time of arrival value determined by the time of arrival estimator 450 from the estimated drift. In other instances the variance calculater, generally determines the spread of the time of arrival values selected by the discriminator circuit 446.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of generating time of arrival estimates for use in determining the location of a mobile unit within a wireless communication network comprising:
   receiving a plurality of data bursts from a group of base sites during a burst collection period;
   determining a time of arrival value for each of the data bursts;
   selecting the time of arrival values, which more closely correspond to a line of sight path;
   estimating a drift value of a reference clock for each of the base sites from the selected time of arrival values; and
   generating a time of arrival estimate for each of the base sites corresponding to a particular time during the burst collection period.

2. The method of claim 1 further comprising transmitting to the communication network the estimated time of arrival, for each base site where a time of arrival was successfully generated.

3. The method of claim 1 wherein the plurality of data bursts received from the group of base sites are interleaved from among the different base sites in the group of base sites.

4. The method of claim 1 wherein the group of base sites include transmitters transmitting data bursts from a known location.

5. The method of claim 1 wherein the group of base sites include cellular base stations.

6. The method of claim 1 wherein the plurality of data bursts are received from at least three base sites, where the estimated time of arrival values for the at least three base sites are used to compute the location of a mobile unit.

7. The method of claim 1 wherein determining a time of arrival value for each of the data bursts includes sampling each of the received data bursts at multiple sampling points, and correlating the sampling points of each of the plurality of data bursts, received during the burst collection period, with a corresponding predetermined data pattern.

8. The method of claim 1 wherein determining a time of arrival value for each of the data bursts includes approximating the time of arrival by fitting a curve to the sampling point received in time having the highest correlation value and a predetermined number of samples received before and after the sampling point having the highest correlation value.

9. The method of claim 8 wherein the predetermined number of samples received before and after the sampling point having the highest correlation value includes the sampling point received immediately prior and the sampling point received immediately after the sampling point having the highest correlation value.

10. The method of claim 9 wherein approximating the time of arrival includes excluding from further consideration any correlated waveform, whose sampled correlation values depart significantly from the expected shape of the correlated waveform.

11. The method of claim 9 wherein approximating the time of arrival includes excluding from further consideration any correlated waveform, which does not include at least sixty percent of the area under the curve occurring between the sampling points immediately adjacent the sampling point having the highest correlation value.

12. The method of claim 9 wherein approximating the time of arrival includes excluding from further consideration any correlated waveform, which does not have an overall minimum correlation of at least a predetermined minimum value.

13. The method of claim 12 wherein the predetermined minimum correlation value is approximately twenty-five percent of the maximum correlation value.

14. The method of claim 8 wherein the approximated time of arrival is selected as occurring at the apex of the fitted curve.

15. The method of claim 8 wherein the curve used to approximate the time of arrival is an inverted parabola having a derived apex corresponding to the point where the slope of the approximating curve is zero.

16. The method of claim 1 wherein determining a time of arrival value for each of the data bursts includes comparing the number of successfully determined time of arrival values corresponding to each one of the group of base sites with a preset minimum number, and discontinuing the further determination of a time of arrival estimate for any of the base sites that does not include at least the preset minimum number of successfully determined time of arrival values.

17. The method of claim 16 wherein the preset minimum number of successfully determined time of arrival values is approximately thirty percent of the total number of received data bursts.

18. The method of claim 16 wherein the preset minimum number of successfully determined time of arrival values is six.

19. The method of claim 1 wherein selecting the time of arrival values, which more closely correspond to a line of sight path includes grouping the time of arrival values into a histogram, and selecting the time of arrival estimates from the substantially adjacent groupings in which a substantial number of the time of arrival values occur.

20. The method of claim 19 wherein the granularity of the groupings in the histogram include groupings with spacings corresponding to the rate of sampling.

21. The method of claim 20 wherein the granularity of the groupings in the histogram include groupings with one half bit spacing corresponding to a two times sampling rate.

22. The method of claim 1 wherein selecting the time of arrival values, which more closely correspond to a line of sight path includes determining a median time of arrival value for the samples received from each of the base sites, and selecting the time of arrival values that are included within a window of time that occurs before and after the median time of arrival value.

23. The method of claim 22 wherein the size of the window of time is computed based upon the length in time of the burst collection period multiplied by the predefined permissible rate of drift of the base sites.

24. The method of claim 1 wherein selecting the time of arrival values, which more closely correspond to a line of sight path includes determining a mean, or average time of arrival value for the samples received from each of the base sites, and selecting the time of arrival values that are included within a window of time that occurs before and after the mean time of arrival value.

25. The method of claim 24 wherein the size of the window of time is computed based upon the length in time of the burst collection period multiplied by the predefined permissible rate of drift of the base sites.

26. The method of claim 1 wherein selecting the time of arrivals, which more closely correspond to a line of sight path includes comparing the number of selected time of arrival values corresponding to each one of the group of base sites with a preset minimum number, and discontinuing the further determination of a time of arrival estimate for any of the base sites that does not include at least the preset minimum number of selected time of arrival values.

27. The method of claim 26 wherein the preset minimum number of selected time of arrival values is equal to six.

28. The method of claim 1 wherein estimating a drift value for each of the base sites includes fitting a straight line to the selected time of arrival values, where the time of arrival values are graphed as a function of time corresponding to the time that the data bursts were received during the burst collection period.

29. The method of claim 28 wherein the straight line estimation is determined using a least squares line fitting approach.

30. The method of claim 28 wherein the straight line estimation is determined using a Kalman drift estimation from the selected time of arrival values.

31. The method of claim 28 wherein the straight line estimation is determined using an adaptive Kalman drift estimation from the selected time of arrival values.

32. The method of claim 1 wherein generating a time of arrival estimate for each of the base sites includes computing a variance value for each of the time of arrival estimates.

33. The method of claim 32 wherein the variance value corresponds to the spread of the differences between the selected time of arrival values and the time of arrival estimate generated from the drift estimation.

34. A processor unit for use in a wireless communication device, coupled to a receiver, which generates a time of arrival estimate for each of a group of base sites, said processor unit comprising:

a processor;

an interface circuitry coupled to said processor and the receiver for configuring the receiver to receive signals corresponding to the group of base sites, and for receiving a plurality of data bursts;

a storage unit coupled to said processor for storing sampling data of the plurality of data bursts and one or more sets of instructions for execution by the processor including prestored instructions for receiving a plurality of data bursts from a group of base sites during a burst collection period and determining a time of arrival value for each of the data bursts, prestored instructions for selecting the time of arrival values, which more closely correspond to a line of sight path and estimating a drift value of a reference clock for each of the base sites from the selected time of arrival values, and prestored instructions for generating a time of arrival estimate for each of the base sites corresponding to a particular time during the burst collection period.

35. A wireless communication device comprising:

an antenna;

a receiver coupled to said antenna;

a processor unit coupled to said receiver including a processor;

an interface circuitry coupled to said processor and the receiver for configuring the receiver to receive signals corresponding to the group of base sites, and for receiving a plurality of data bursts;

a storage unit coupled to said processor for storing sampling data of the plurality of data bursts and one or more sets of instructions for execution by the processor including prestored instructions for receiving a plurality of data bursts from a group of base sites during a burst collection period and determining a time of arrival value for each of the data bursts, prestored instructions for selecting the time of arrival values, which more closely correspond to a line of sight path and estimating a drift value of a reference clock for each of the base sites from the selected time of arrival values, and prestored instructions for generating a time of arrival estimate for each of the base sites corresponding to a particular time during the burst collection period.

36. The wireless communication device of claim 35 further comprising a transmitter coupled to said antenna and said process unit for transmitting the generated time of arrival estimate for each of the base sites.

37. A processor unit for use in a wireless communication device, coupled to a receiver, which generates a time of arrival estimate for each of a group of base sites, said processor unit comprising:

a sampling circuit for producing multiple sampling points from a received signal;

a correlator coupled to the sampling circuit for correlating the sampling points with a corresponding predetermined data pattern and determining a time of arrival value for each data burst;

a discriminator circuit coupled to the correlator for selecting the time of arrival values, which most closely correspond to a line of sight path;

a drift estimator coupled to the discriminator circuit for estimating an estimated drift value of a reference clock for each of the base stations from the selected time of arrival values;

a time of arrival estimator coupled to the drift estimator for estimating a time of arrival value from the estimated drift calculation for each of the base stations for a selected substantially consistent point in time; and a variance calculator coupled to the time of arrival estimator for computing a variance value corresponding to the accumulated degree of deviation of the time of arrival value determined by the time of arrival estimator.

* * * * *